(12) United States Patent
Otsuka et al.

(10) Patent No.: US 10,864,808 B2
(45) Date of Patent: Dec. 15, 2020

(54) OUTER WEATHERSTRIP

(71) Applicant: TOYODA GOSEI CO., LTD., Kiyosu (JP)

(72) Inventors: Hirofumi Otsuka, Kiyosu (JP); Hiroshi Sugawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 82 days.

(21) Appl. No.: 16/227,263

(22) Filed: Dec. 20, 2018

(65) Prior Publication Data
US 2019/0232770 A1 Aug. 1, 2019

(30) Foreign Application Priority Data

Jan. 30, 2018 (JP) .................................. 2018-013205

(51) Int. Cl.
*B60J 10/75* (2016.01)
*B60J 10/16* (2016.01)
*B60J 10/277* (2016.01)

(52) U.S. Cl.
CPC ............... *B60J 10/75* (2016.02); *B60J 10/16* (2016.02); *B60J 10/277* (2016.02)

(58) Field of Classification Search
CPC ......... B60J 10/75; B60J 10/16; B60J 10/277; B60J 10/15; B60J 10/76
See application file for complete search history.

(56) References Cited

U.S. PATENT DOCUMENTS

| 5,143,772 | A | * | 9/1992 | Iwasa | B32B 25/045 428/122 |
| 5,197,243 | A | * | 3/1993 | Mozawa | B29C 35/12 52/208 |
| 5,552,194 | A | * | 9/1996 | Ito | C03C 27/048 428/31 |
| 5,624,148 | A | * | 4/1997 | Young | B60J 10/16 296/146.15 |
| 5,968,615 | A | * | 10/1999 | Schlappa | E04B 1/948 428/34.1 |
| 6,023,888 | A | * | 2/2000 | Dover | B60J 10/79 49/441 |
| 6,368,700 | B1 | * | 4/2002 | Venkataswanny | B32B 27/08 428/217 |
| 2006/0103047 | A1 | * | 5/2006 | Zwolinski | B60J 10/70 264/174.11 |

(Continued)

FOREIGN PATENT DOCUMENTS

JP 2007-137357 A 6/2007
JP 2016-147518 A 8/2016

*Primary Examiner* — Justin B Rephann
(74) *Attorney, Agent, or Firm* — Posz Law Group, PLC

(57) ABSTRACT

An outer weatherstrip formed of a thermoplastic elastomer fitted to an upper edge portion of a door panel of an automobile door, for sealing a space between the door panel and a door glass includes a main body consisting of a vehicle interior-side side wall, a top wall, and a vehicle exterior-side side wall, and an upper seal lip and a lower seal lip protruding from the vehicle interior-side side wall to the door glass side. A plasticizer-rich layer and a plasticizer-rich layer containing a higher proportion of a plasticizer component compared to the thermoplastic elastomer forming the upper seal lip and the lower seal lip are formed on the sides of the upper seal lip and the lower seal lip abutting on the door glass.

5 Claims, 3 Drawing Sheets

(56) References Cited

U.S. PATENT DOCUMENTS

| | | | |
|---|---|---|---|
| 2006/0125275 A1* | 6/2006 | Wato | B60J 10/17 296/93 |
| 2006/0272217 A1* | 12/2006 | Gopalan | B32B 37/153 49/490.1 |
| 2007/0169417 A1* | 7/2007 | Ellis | B60J 10/76 49/490.1 |

* cited by examiner

OUTER WEATHERSTRIP

CROSS REFERENCE TO RELATED APPLICATION

This application is based on and incorporates herein by reference Japanese Patent Application No. 2018-013205 filed on Jan. 30, 2018.

BACKGROUND OF THE INVENTION

(1) Field of the Invention

The present invention relates to an outer weatherstrip fitted to an upper edge portion of an automobile door.

(2) Description of Related Art

As shown in FIG. 3, a door 1 of an automobile generally includes a door panel 2 and a door frame 3 constituting a window frame. The opening of the door frame 3 is opened and closed by a door glass 4 moving up and down.

An outer weatherstrip 100 is fitted to an upper edge portion (also called a "beltline") 2c of the door panel 2.

As in a schematic diagram shown in FIG. 4, the outer weatherstrip 100 includes as a basic structure a main body 500 extended along the upper edge portion 2c of the door panel 2, and an upper seal lip 600 and a lower seal lip 700 extending from a vehicle interior-side side wall (510) of the main body 500 to the door glass 4, and is fitted at the main body 500 to the upper edge portion 2c of the door panel 2.

The upper seal lip 600 and the lower seal lip 700 have a distal end portion 610 and a distal end portion 710 that abut on the door glass 4 and bend, and seal the space between the upper seal lip 600 and the lower seal lip 700 and the door glass 4 by their restoring forces, preventing entry of foreign matter such as water droplets and dust and noise from the outside into the vehicle interior. Further, when the door glass 4 moves up and down, they remove water droplets, dust, and the like adhering to the door glass 4, providing good visibility to the driver.

Automotive sealing members including the outer weatherstrip 100 have been manufactured using vulcanized rubber such as EPDM. In recent years, however, products using thermoplastic elastomers (TPE) have been widespread in view of their having several characteristics similar to those of rubber, their specific gravities lower than those of rubber compounds, their ease of molding, recycling, and so on.

In recent years, sound insulation performance has been improved, and in-vehicle air conditioning, acoustics, and communication functions have been increased in performance. Consequently, the door glass 4 is continuously in a closed state. By closing the door glass 4, it moves to the outside of the vehicle at the upper edge portion 2c of the door panel 2, so that the upper seal lip 600 and the lower seal lip 700 are held in a most bending state for a long time. As a result, in the outer weatherstrip 100 using a thermoplastic elastomer (TPE), aged deterioration of the upper seal lip 600 and the lower seal lip 700 appears as the phenomenon of permanent deformation (compression permanent strain) in the most bending state. When the door glass 4 moves up and down, the restoring force to the door glass 4 side decreases, a gap is formed between the door glass 4 and the upper seal lip 600 or/and the lower seal lip 700, and it becomes impossible to prevent entry of foreign matter such as water droplets and dust and noise from the outside into the vehicle interior. Further, it becomes impossible to remove water droplets, dust, and the like adhering to the door glass 4, causing a problem that good visibility cannot be provided to the driver.

To solve the above problem, outer weatherstrips with seal lips improved in durability have been known. As shown in FIG. 5, for an outer weatherstrip 100 of JP 2016-147518 A, the outer weatherstrip 100 is formed of a main body 500, an upper seal lip 600, and a lower seal lip 700, and the upper seal lip 600 and the lower seal lip 700 have a proximal end portion 620 and a proximal end portion 720 of a reduced thickness in cross section formed on the main body 500 side, and a distal end portion 610 and a distal end portion 710 of an increased thickness on the door glass 4 side. The distal end portion 610 and the distal end portion 710 abut on the door glass 4, and bend about the proximal end portion 620 and the proximal end portion 720, so that the distal end portion 610 and the distal end portion 710 generate restoring forces to the door glass 4, bringing the outer weatherstrip 100 into tight contact with the door glass 4.

On the other hand, the upper seal lip 600 has a protruding portion 630 protruding toward the lower seal lip 700. When one of the upper seal lip 600 and the lower seal lip 700 deteriorates, rotating in a direction away from the door glass 4, the protruding portion 630 presses the other seal lip against the door glass 4, thereby solving the above-described problem caused by aged deterioration. However, in this case, the new provision of the protruding portion 630 increases the amount of use of the material, causing a problem in cost and weight reduction.

Next, for an outer weatherstrip of JP 2007-137357 A, a main body is formed of a soft resin material, and an upper seal lip and a lower seal lip that elastically contact a door glass and are elastically deformed are formed of a special EPDM (low-temperature cross-linked EPDM cross-linked at 150° C. or less) rubber material that can be coextruded with the main body.

The low-temperature cross-linked EPDM has an advantage that it is superior in elasticity to soft resin materials, and compression permanent deformation hardly appears. JP 2007-137357 A uses this advantage to solve the above-described problem. In this case, however, it is necessary to use a special material that can be cross-linked at low temperature, causing a problem in cost.

SUMMARY OF THE INVENTION

It is thus an object of the present invention to provide an outer weatherstrip that maintains holding force between the outer weatherstrip and a door glass over time, can hold sufficient durability, and is lightweight and inexpensive.

To solve the above problem, an outer weatherstrip according to a first aspect of the present invention includes a main body extended along an upper edge portion of a door panel of a vehicle door and having a vehicle exterior-side side wall, a top wall, and a vehicle interior-side side wall, and a seal lip protruded from a vehicle interior-side side surface of the main body to a door glass housed in the door, in which the outer weatherstrip is formed of a thermoplastic elastomer, the seal lip includes a distal end portion located on a door glass side and a hinge portion located between the distal end portion and the vehicle interior-side side wall and serving as a support point at which the seal lip bends when abutting on the door glass, and a plasticizer-rich layer containing a higher proportion of a plasticizer component compared to the plasticizer component contained in the thermoplastic elastomer forming the seal lip is formed on a side of the seal lip abutting on the door glass. Note that the plasticizer component in the present invention is process oil contained in the thermoplastic elastomer.

Here, process oil is roughly divided into three kinds: paraffinic process oil, naphthenic process oil, and aromatic process oil. In the present invention, any of the kinds of process oil can be used singly or in combination.

In the first aspect of the present invention, the outer weatherstrip includes the main body extended along the upper edge portion of the door panel of the vehicle door, and the seal lip protruded from the vehicle interior-side side surface of the main body to the door glass of the door and having the hinge portion and the distal end portion. Consequently, when the outer weatherstrip is fitted to the upper edge portion of the door frame, the distal end portion of the seal lip abuts on the door glass, the seal lip generates restoring force to the door glass, enabling secure sealing between the door glass and the outer weatherstrip.

The plasticizer-rich layer containing a higher proportion of the plasticizer component compared to the plasticizer component contained in the thermoplastic elastomer forming the seal lip is formed on the side of the seal lip abutting on the door glass. Consequently, a phenomenon in which the plasticizer component moves from the high-concentration plasticizer-rich layer side to the low-concentration seal lip side occurs over time in the seal lip, and contraction force is generated in the plasticizer-rich layer in which the plasticizer component is reduced, and expansion force is generated in the seal lip in which the plasticizer component is increased.

As a result, the seal lip tending to be warped and deformed to the door glass side compensates for a reduction in restoring force due to the phenomenon of permanent deformation (compression permanent strain), maintains initial holding force between the seal lip and the door glass, and can prevent entry of foreign matter such as water droplets and dust and noise from the outside into the vehicle interior. Further, when the door glass moves up and down, water droplets, dust, and the like adhering to the door glass can be removed to provide good visibility to the driver.

In the outer weatherstrip according to a second aspect of the present invention, the plasticizer-rich layer is formed in the hinge portion on the side of the seal lip abutting on the door glass.

In the second aspect of the present invention, since the plasticizer-rich layer is formed in the hinge portion on the side of the seal lip abutting on the door glass, there occurs a phenomenon in the hinge portion in which the plasticizer component moves from the high-concentration plasticizer-rich layer side to the low-concentration hinge portion side over time, and contraction force is generated in the plasticizer-rich layer in which the plasticizer component is reduced, and expansion force is generated in the hinge portion in which the plasticizer component is increased.

As a result, the hinge portion generates warping and deformation force to the door glass side. The force propagates to the entirety of the seal lip, compensating for a reduction in restoring force due to the phenomenon of permanent deformation (compression permanent strain), so that initial holding force between the seal lip and the door glass is maintained, which allows prevention of entry of foreign matter such as water droplets and dust and noise from the outside into the vehicle interior. Further, when the door glass moves up and down, water droplets, dust, and the like adhering to the door glass can be removed to provide good visibility to the driver. Furthermore, no plasticizer-rich layer is present on the seal lip other than the hinge portion, which prevents a reduction in hardness and occurrence of surface roughness of the seal lip surface caused by the plasticizer being rich.

In the outer weatherstrip according to a third aspect of the present invention, a difference in weight fractions between the plasticizer component contained in the plasticizer-rich layer and the plasticizer component contained in the seal lip is 3% to 25%.

In the third aspect of the present invention, the difference in weight fractions between the plasticizer component contained in the plasticizer-rich layer and the plasticizer component contained in the seal lip is 3% to 25%. Consequently, when fitted to the upper edge portion of the door frame of the automobile door, the outer weatherstrip has initial performance including good workability during fitting and good holding force, and also after being fitted, the outer weatherstrip maintains the holding force between the door glass and the seal lip over time, and can hold sufficient durability.

In the outer weather strip using the thermoplastic elastomer, the plasticizer-rich layer containing a higher proportion of the plasticizer component compared to the plasticizer component contained in the seal lip is formed on the side of the seal lip abutting on the door glass. Consequently, a reduction in restoring force caused by a phenomenon in which the seal lip is permanently deformed in an upward bending state (compression permanent strain) is compensated for, so that initial holding force between the outer weatherstrip and the door glass is maintained, improving the product quality. Further, the present invention produces the above effects over time, and thus has no influence on initial performance including workability when the outer weatherstrip is fitted to the upper edge portion of the door frame of the automobile door, and good holding force between the outer weatherstrip and the door glass when the outer weatherstrip is fitted.

DETAILED DESCRIPTION OF PREFERRED EMBODIMENTS

The present invention relates to an outer weatherstrip in which a plasticizer-rich layer containing a high proportion of a plasticizer component is provided on the side of a seal lip abutting on a door glass from a vehicle interior-side wall of a main body to a distal end portion, so that after fitted to an upper edge portion of a door panel, the outer weatherstrip maintains holding force between the outer weatherstrip and the door glass over time, and can hold sufficient durability.

Figure 3:
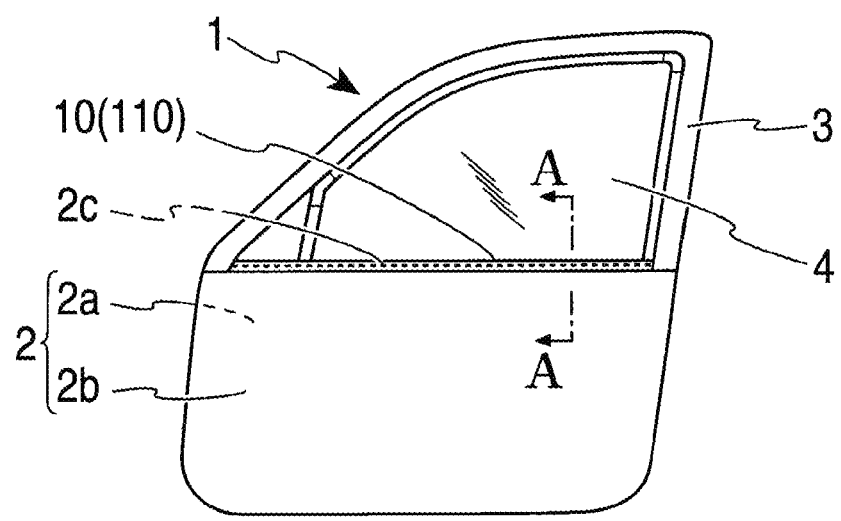
FIG. 3 is a front view of an automobile door (front).
Figure 4:
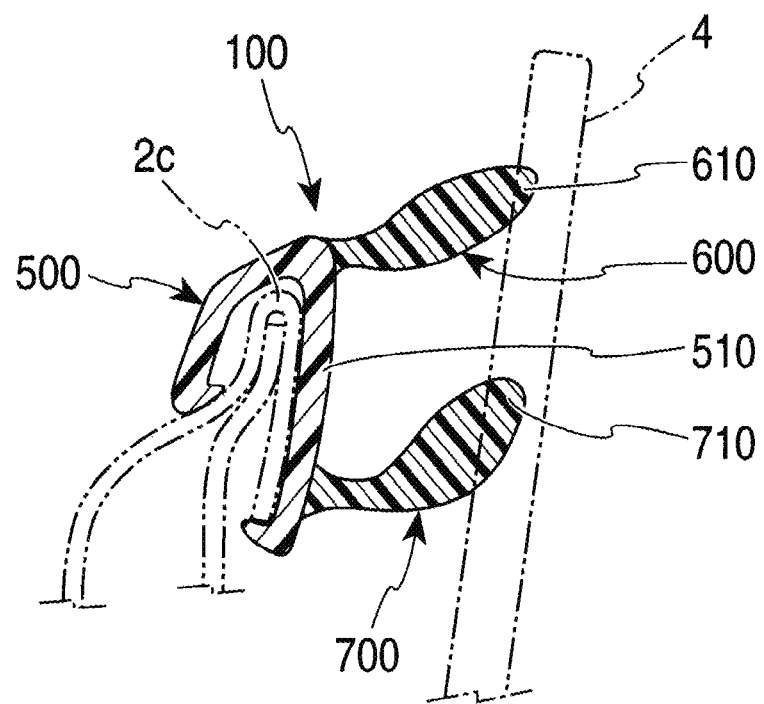
FIG. 4 is a schematic explanatory view of an outer weatherstrip, and is a cross-sectional view taken along arrow line A-A in FIG. 3.
Figure 5:
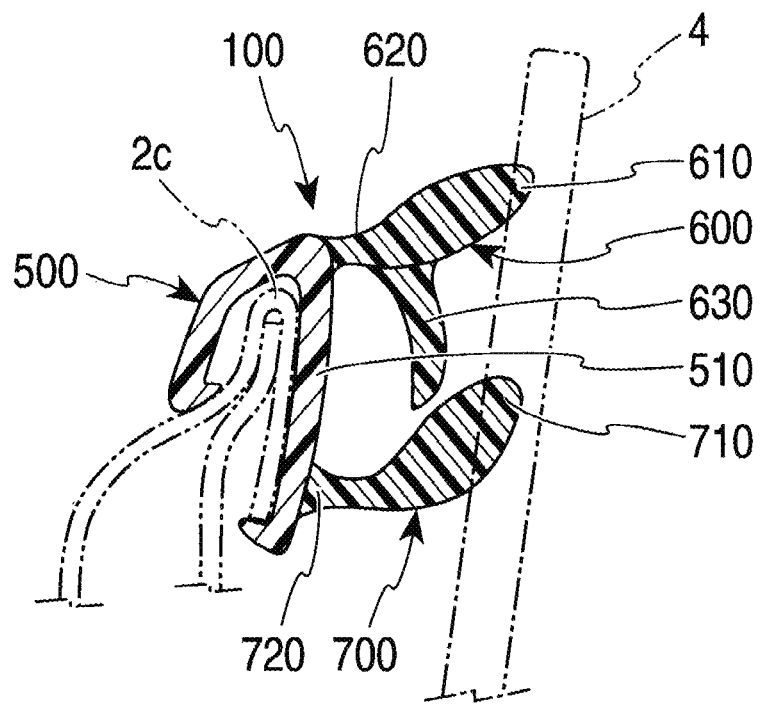
FIG. 5 is a cross-sectional view of a conventional outer weatherstrip fitted to an upper edge portion of a door frame of an automobile door, and is a cross-sectional view taken along arrow line A-A in FIG. 3.

First, the configuration of a door 1 to which an outer weatherstrip 10 is fitted will be briefly described. As shown in FIG. 3, the door 1 has a door panel 2 at a left front portion of an automobile and a door frame 3 constituting a window frame of the door 1. Although FIG. 3 shows the left front portion, the present invention is applicable to doors at a right front portion and left and right rear portions.

The door panel 2 is fitted to a vehicle body via a hinge (not shown). The door panel 2 is formed in a bag shape opened upward with an inner panel 2a disposed on the vehicle-interior side and an outer panel 2b disposed on the vehicle-exterior side joined together. The door frame 3 is fitted to the upper edge of the door panel 2. A door glass 4 is housed in the door panel 2, and is raised and lowered by a lifting device (not shown) to open and close a window opening formed between the door panel 2 and the door frame 3. The outer weatherstrip 10 is fitted to an upper edge portion 2c of the outer panel 2b.

Figure 1:
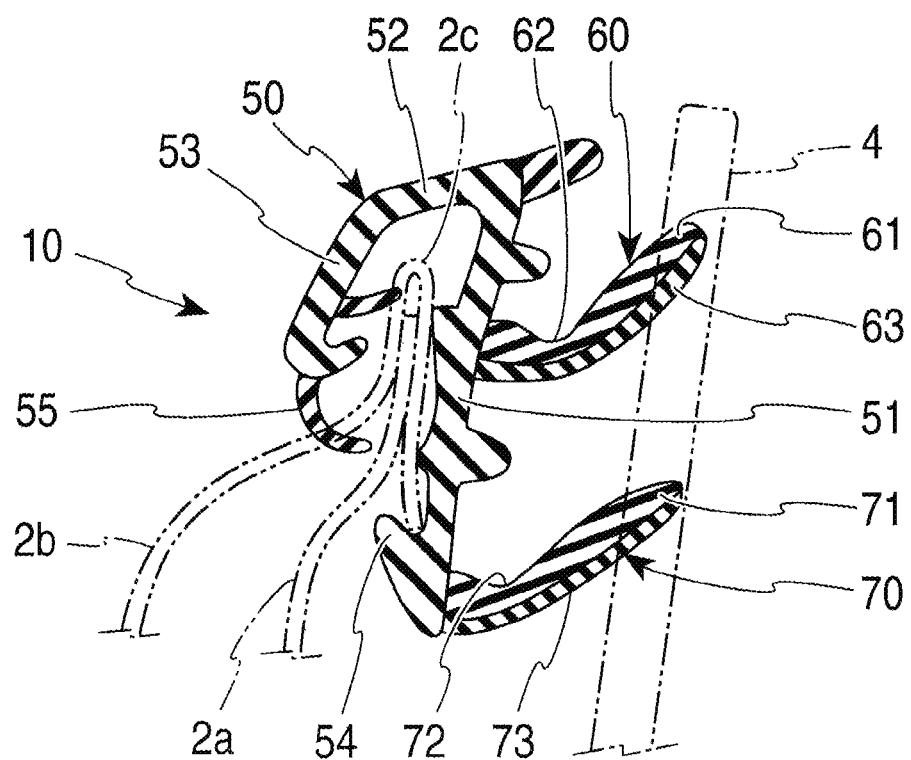
FIG. 1 is a cross-sectional view of an outer weatherstrip in a first embodiment of the present invention fitted to an upper edge portion of a door frame of an automobile door, and is a cross-sectional view taken along arrow line A-A in FIG. 3.

FIG. 1 shows a first embodiment of the present invention, and is a sectional view taken along arrow line A-A in FIG. 3 of the outer weatherstrip 10 fitted to the upper edge portion 2c of the door panel 2. The outer weatherstrip 10 has a main body 50 consisting of a vehicle exterior-side side wall 53 and a vehicle interior-side side wall 51 facing each other at a predetermined distance, and a top wall 52 integrally connecting the upper edges of the vehicle exterior-side side wall 53 and the vehicle interior-side side wall 51.

On the vehicle interior-side side surface of the vehicle interior-side side wall 51, an upper seal lip 60 and a lower seal lip 70 protruded to the door glass 4 are integrally formed in a protruding manner across both ends of the vehicle interior-side side wall 51 in the longitudinal direction. The upper seal lip 60 and the lower seal lip 70 have a substantially flat fold shape, and protrude obliquely upward from the vehicle interior-side side wall 51.

The upper seal lip 60 includes a hinge portion 62 provided at a portion extended substantially horizontally from the vehicle interior-side side wall 51 of the main body 50 toward the door glass 4, and a distal end portion 61 extended obliquely upward from an end portion of the hinge portion 62 on the door glass 4 side to the door glass 4. A central portion of the hinge portion 62 in the vehicle width direction is slightly constricted. That is, the thickness of the central portion of the hinge portion 62 in the vehicle width direction is slightly smaller than the thickness of both end portions of the hinge portion 62 in the vehicle width direction. The thickness of an end portion of the distal end portion 61 on the hinge portion 62 side and an end portion on the door glass 4 side is smaller than the thickness of a middle portion of the distal end portion 61 in the vehicle width direction. When the door glass 4 rises, causing an external force in the vehicle height direction to act on the distal end portion 61 of the upper seal lip 60, the hinge portion 62 mainly bends. That is, the distal end portion 61 rotates with the hinge portion 62 as a support point.

Like the upper seal lip 60, the lower seal lip 70 is extended in the vehicle longitudinal direction along the lower edge of the window opening. The lower seal lip 70 is formed below the upper seal lip 60. The configuration of the lower seal lip 70 is substantially the same as that of the upper seal lip 60. That is, the lower seal lip 70 includes a hinge portion 72 provided at a portion extended substantially horizontally from the vehicle interior-side side wall 51 of the main body 50 toward the door glass 4, and a distal end portion 71 extended obliquely upward from an end portion of the hinge portion 72 on the door glass 4 side to the door glass 4. A central portion of the hinge portion 72 in the vehicle width direction is slightly constricted. The thickness of an end portion of the distal end portion 71 on the hinge portion 72 side and an end portion on the door glass 4 side is smaller than the thickness of a middle portion of the distal end portion 71 in the vehicle width direction. When an external force in the vehicle height direction acts on the distal end portion 71 of the lower seal lip 70, the hinge portion 72 mainly bends. That is, the distal end portion 71 rotates with the hinge portion 72 as a support point.

A plasticizer-rich layer 63 and a plasticizer-rich layer 73 each containing a higher proportion of a plasticizer component compared to the plasticizer component contained in the upper seal lip 60 and the lower seal lip 70 are formed on the entire surfaces of the upper seal lip 60 and the lower seal lip 70 on the sides abutting on the door glass 4.

The main body 50 (the vehicle exterior-side side wall 53, the vehicle interior-side side wall 51, and the top wall 52) of the outer weatherstrip 10 has a predetermined rigidity (for example, 85 to 95 degrees in durometer hardness HDA according to JIS K 7215), and is made of a slightly elastically deformable material. On the other hand, the upper seal lip 60 and the lower seal lip 70 are integrally co-extruded with the main body 50 including the vehicle exterior-side side wall 53, and thus are basically formed of a material of the same kind as the main body 50. However, since they are portions elastically contacting the door glass 4, they are made of a material more flexible and more easily elastically deformable than that of the main body 50. Specifically, a material with a durometer hardness HDA of 60 to 80 degrees according to JIS K 7215 is used.

In the present embodiment, the outer weatherstrip 10 uses TPV (dynamically vulcanized thermoplastic elastomer) as a thermoplastic elastomer. The difference in weight fractions between the plasticizer component contained in the plasticizer-rich layer 63 and the plasticizer-rich layer 73 and the plasticizer component contained in the thermoplastic elastomer forming the upper seal lip 60 and the lower seal lip 70 is 12%. The thicknesses of the plasticizer-rich layer 63 and the plasticizer-rich layer 73 are each 0.6 mm.

The main body 50 of the outer weatherstrip 10 is provided with a projection 55 and a claw 54 on the vehicle exterior-side side wall 53 and the vehicle interior-side side wall 51. On the other hand, the outer panel 2b is formed in a flange shape extending in the vehicle longitudinal direction with sheet metal constituting the outer panel 2b folded in layers. When the upper edge portion 2c of the outer panel 2b is inserted between the vehicle interior-side side wall 51 and the vehicle exterior-side side wall 53 by lowering the outer weatherstrip 10 from above the upper edge portion 2c of the outer panel 2b, the claw 54 is engaged with an end face of the sheet metal with the projection 55 abutting on the surface of the outer panel 2b opposite to the passenger compartment, and the outer weatherstrip 10 is fitted to the upper edge portion 2c of the door panel 2.

In FIG. 1, the plasticizer-rich layer 63 and the plasticizer-rich layer 73 containing a higher proportion of the plasticizer component compared to the plasticizer component contained in the upper seal lip 60 and the lower seal lip 70 are formed on the entire surfaces of the upper seal lip 60 and the lower seal lip 70 on the sides abutting on the door glass 4. Consequently, there occurs a phenomenon in which the plasticizer component moves from the high-concentration side to the low-concentration side, that is, from the plasticizer-rich layer 63 and the plasticizer-rich layer 73 to the upper seal lip 60 and the lower seal lip 70 over time, and contraction forces are generated in the plasticizer-rich layer 63 and the plasticizer-rich layer 73 in which the plasticizer component is reduced, and expansion forces are generated in the upper seal lip 60 and the lower seal lip 70 in which the plasticizer component is increased.

As a result, the upper seal lip 60 and the lower seal lip 70 are warped and deformed in a direction to fall to the door glass 4 side, and the abutment forces between the upper seal lip 60 and the lower seal lip 70 and the door glass 4 are enhanced. Consequently, reductions in restoring forces due to the phenomenon of permanent deformation (compression permanent strain) of the upper seal lip 60 and the lower seal lip 70 are compensated for to allow both the upper seal lip 60 and the lower seal lip 70 to maintain the holding forces against the door glass 4, so that it is possible to prevent entry of foreign matter such as water droplets and dust and noise from the outside into the vehicle interior. Further, when the door glass 4 moves up and down, water droplets, dust, and the like adhering to the door glass 4 can be removed to provide good visibility to the driver.

In the present embodiment, the plasticizer-rich layer 63 and the plasticizer-rich layer 73 are formed on the entire sides of the seal lips abutting on the door glass 4. As a modification of the present embodiment, the plasticizer-rich layer 63 and the plasticizer-rich layer 73 may be partially formed. For example, they may be formed in a region from a proximal end portion beyond a hinge portion or a region from a distal end portion beyond a hinge portion on the side of the seal lip abutting on the door glass 4, or on the side of the seal lip abutting on the door glass 4 in a fragmental fashion. In this case, in the same way as above, there occurs a phenomenon in which in portions where the plasticizer-rich layer 63 and the plasticizer-rich layer 73 are present, the plasticizer component moves from the high-concentration side to the low-concentration side over time, compensating for reductions in restoring forces due to the phenomenon of permanent deformation (compression permanent strain) of the upper seal lip 60 and the lower seal lip 70, which allows both the upper seal lip 60 and the lower seal lip 70 to maintain their initial holding forces against the door glass 4.

Figure 2:
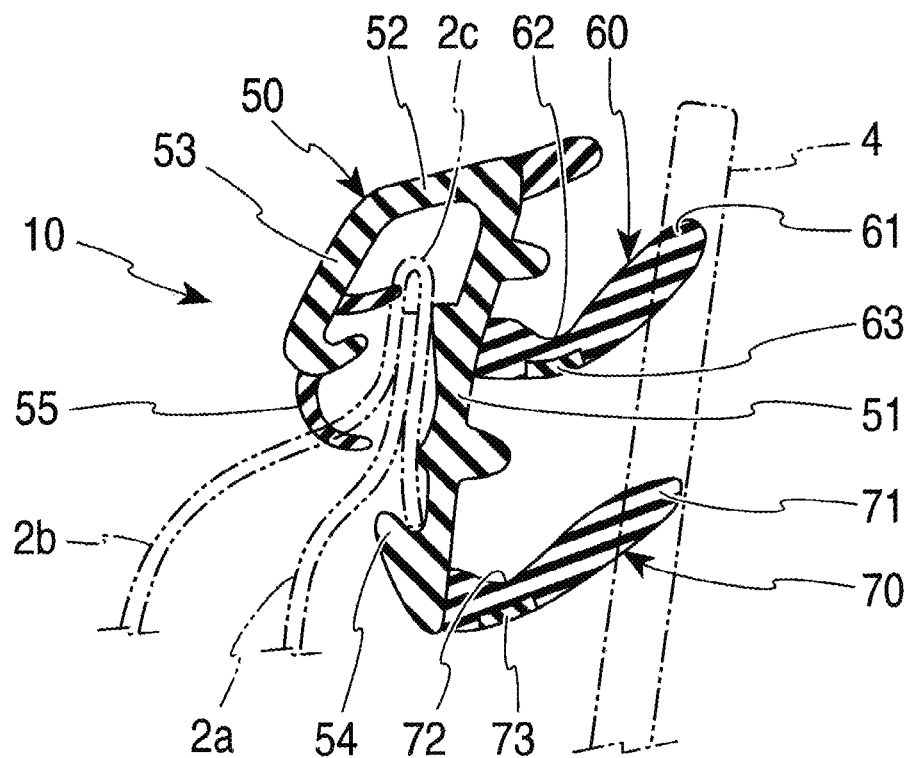
FIG. 2 is a cross-sectional view of an outer weatherstrip in a second embodiment of the present invention fitted to an upper edge portion of a door frame of an automobile door, and is a cross-sectional view taken along arrow line A-A in FIG. 3.

FIG. 2 shows a second embodiment of the present invention, and is a cross-sectional view taken along arrow line A-A in FIG. 3 of an outer weatherstrip 10 fitted to the upper edge portion 2c of the door panel 2. The difference between the second embodiment and the above-described first embodiment is that in the second embodiment, a plasticizer-rich layer 63 and a plasticizer-rich layer 73 are formed in a hinge portion 62 and a hinge portion 72 of an upper seal lip 60 and a lower seal lip 70. Also in the present embodiment, the difference in weight fractions between a plasticizer component contained in the plasticizer-rich layer 63 and the plasticizer-rich layer 73 and the plasticizer component contained in a thermoplastic elastomer forming the upper seal lip 60 and the lower seal lip 70 is 12%. The thicknesses of the plasticizer-rich layer 63 and the plasticizer-rich layer 73 are each 0.6 mm.

In FIG. 2, since the plasticizer-rich layer 63 and the plasticizer-rich layer 73 are formed in the hinge portion 62 and the hinge portion 72, there occurs a phenomenon in the hinge portion 62 and the hinge portion 72 in which the plasticizer component moves from the plasticizer-rich layer 63 and the plasticizer-rich layer 73 on the high-concentration side to the hinge portion 62 and the hinge portion 72 on the low-concentration side over time, and contraction forces are generated in the plasticizer-rich layer 63 and the plasticizer-rich layer 73 in which the plasticizer component is reduced, and expansion forces are generated in the hinge portion 62 and the hinge portion 72 in which the plasticizer component is increased.

As a result, the hinge portion 62 and the hinge portion 72 generate warping and deformation forces to the door glass 4 side. The forces propagate to the entireties of the upper seal lip 60 and the lower seal lip 70, compensating for reductions in restoring forces of the upper seal lip 60 and the lower seal lip 70 due to the phenomenon of permanent deformation (compression permanent strain), so that both the upper seal lip 60 and the lower seal lip 70 are allowed to maintain their initial restoring forces against the door glass 4 to prevent entry of foreign matter such as water droplets and dust and noise from the outside into the vehicle interior. Further, when the door glass 4 moves up and down, water droplets, dust, and the like adhering to the door glass 4 can be removed to provide good visibility to the driver. Further, no plasticizer-rich layers are present on the upper seal lip 60 and the lower seal lip 70 other than the hinge portion 62 and the hinge portion 72, which prevents reductions in hardness and occurrence of surface roughness of the door glass 4-side surfaces of the upper seal lip 60 and the lower seal lip 70 that accompany the plasticizer being rich.

Verification of Effects

A phenomenon accompanying the formation of a plasticizer-rich layer, specifically, the fact that a plasticizer component moves from the high-concentration side to the low-concentration side over time, and contraction force is generated in a plasticizer-rich layer in which the plasticizer component is reduced, and expansion force is generated in a layer in contact with the plasticizer-rich layer in which the plasticizer component is increased (hereinafter referred to as "substrate"), which results in the occurrence of warping with the substrate side expanded was verified as follows.

The difference in the weight fraction of the plasticizer component in the plasticizer-rich layer is 12% as in the first embodiment and the second embodiment. Three test pieces were prepared. Each test piece was a rectangular parallelepiped with a size of 40 mm in width, 20 mm in length, and in the thickness direction, 1.2 mm in thickness, which is the sum of 0.6 mm in the thickness of the substrate and 0.6 mm in the thickness of the plasticizer-rich layer. The weight fraction of the plasticizer component contained in the substrate was 33% by weight.

Table 1 shows the results of measuring the amount of warping when the test pieces were placed in an atmosphere at 80° C. The test pieces were disposed with the substrate side up and the plasticizer-rich layer side down. The amount of deformation was measured with a profile projector with the lower surface of the plasticizer-rich layer as a reference plane. Deformation (warping) was caused by the expansion of the substrate side.

TABLE 1

Measurement results of warping amount (mm)
(80° C., average value of n = 3)

| | Test time (hours) | | | | | |
|---|---|---|---|---|---|---|
| | 0 | 24 | 48 | 200 | 720 | 1200 |
| Warping amount (mm) | 0 | 2.9 | 3.5 | 3.6 | 3.6 | 3.6 |

The difference in the weight fraction of the plasticizer component in the plasticizer-rich layer, which was 12% in the embodiments and the verification conducted, is desirably in the range of 3% to 25%. When the difference in the weight fraction of the plasticizer component in the plasticizer-rich layer is small, the amount of warping is small, and its effect is small. When the difference in the weight fraction of the plasticizer component exceeds 25%, the amount of warping is excessive, and the entire seal lip changes its shape greatly and does not normally abut on the door glass, which causes insufficient removal of water droplets, dust, and the like adhering to the door glass when the door glass moves up and down, and prevents provision of good visibility to the driver.

Note that the weight fraction of the plasticizer component contained in the substrate, which was 33% by weight in the above verification, is desirably in the range of 27% by weight to 50% by weight. The weight fraction of the plasticizer component contained in the plasticizer-rich layer is desirably in the range of 30% by weight to 65% by weight. Within the ranges described left, the effects of the present invention can be sufficiently confirmed.

The thickness of the plasticizer-rich layer is desirably in the range of one third to two times the thickness of the substrate. It is more desirable that the thickness of the plasticizer-rich layer be one time, that is, equal to the thickness of the substrate. In the verification test, the plasticizer-rich layer is 0.6 mm and the substrate thickness is 0.6 mm, which is one time.

Although the first and second embodiments were verified with TPV (dynamically vulcanized thermoplastic elastomer) as a thermoplastic elastomer used, TPS (styrene thermoplastic elastomers) can also provide the same effects.

The implementation of the present invention is not limited to the above embodiments, and various modifications are possible without departing from the object of the present invention.

For example, although both the upper seal lip 60 and the lower seal lip 70 are provided with the plasticizer-rich layers in the first and second embodiments, only one of the upper seal lip 60 and the lower seal lip 70 may be provided with the plasticizer-rich layer.

For example, the upper seal lip 60 and the lower seal lip 70 may not be identical or uniform in the weight fraction of the plasticizer component and the thickness of the plasticizer-rich layers, which may be changed depending on the material and size of the upper seal lip 60 and the lower seal lip 70 to the extent based on the above-described idea about the difference in the weight fractions of the plasticizer component and the thicknesses.

For example, surfaces abutting on the door glass 4 of the upper seal lip 60 and the lower seal lip 70 may be flocked to increase the effect of wiping water droplets, dust, and the like.

For example, when the plasticizer-rich layer is formed on the entire seal lip (first embodiment), and when the plasticizer-rich layer is partially formed (modification of first embodiment) in a distal end portion of the seal lip abutting on the door glass 4, the plasticizer-rich layer shows a reduction in surface hardness and surface roughness accompanying the plasticizer being rich. Thus, a cover layer thinner than the plasticizer-rich layer having a thickness that does not impair the effects of the invention may be provided on the side of the plasticizer-rich layer abutting on the door glass.

What is claimed is:

1. An outer weatherstrip comprising:
   a main body extended along an upper edge portion of a door panel of a vehicle door and having a vehicle exterior-side side wall, a top wall, and a vehicle interior-side side wall; and
   a seal lip adapted to protrude from a vehicle interior-side side surface of the main body to a door glass housed in the door,
   wherein the outer weatherstrip is formed of a thermoplastic elastomer,
   the seal lip includes a distal end portion located on a door glass side and a hinge portion located between the distal end portion and the vehicle interior-side side wall and serving as a support point at which the seal lip bends when abutting on the door glass, and
   a plasticizer-rich layer containing a higher proportion of a plasticizer component compared to the plasticizer component contained in the thermoplastic elastomer forming the seal lip is formed on a side of the seal lip adapted to abut on the door glass, wherein
   a difference in weight fractions between the plasticizer component contained in the plasticizer-rich layer and the plasticizer component contained in the seal lip is 3% to 25%, and
   the hinge portion has a smaller thickness than other parts of the lip seal.

2. The outer weatherstrip according to claim 1, wherein the plasticizer-rich layer is formed in the hinge portion on the side of the seal lip adapted to abut on the door glass.

3. An outer weatherstrip comprising:
   a main body extended along an upper edge portion of a door panel of a vehicle door and having a vehicle exterior-side side wall, a top wall, and a vehicle interior-side side wall; and
   a seal lip adapted to protrude from a vehicle interior-side side surface of the main body to a door glass housed in the door,
   wherein the outer weatherstrip is formed of a thermoplastic elastomer,
   the seal lip includes a distal end portion located on a door glass side and a hinge portion located between the distal end portion and the vehicle interior-side side wall and serving as a support point at which the seal lip bends when abutting on the door glass, and
   a plasticizer-rich layer containing a higher proportion of a plasticizer component compared to the plasticizer component contained in the thermoplastic elastomer forming the seal lip is formed on a side of the seal lip adapted to abut on the door glass,
   wherein the plasticizer-rich layer is formed in the hinge portion on the side of the seal lip adapted to abut on the door glass and does not abut the door glass.

4. The outer weatherstrip according to claim 3, wherein a difference in weight fractions between the plasticizer component contained in the plasticizer-rich layer and the plasticizer component contained in the seal lip is 3% to 25%.

5. The outer weatherstrip according to claim 3, wherein the hinge portion has a smaller thickness than other parts of the lip seal.

* * * * *